C. A. MAYNARD.
RUBBER TIRE SETTER.
APPLICATION FILED JULY 20, 1908.
929,617.
Patented July 27, 1909.
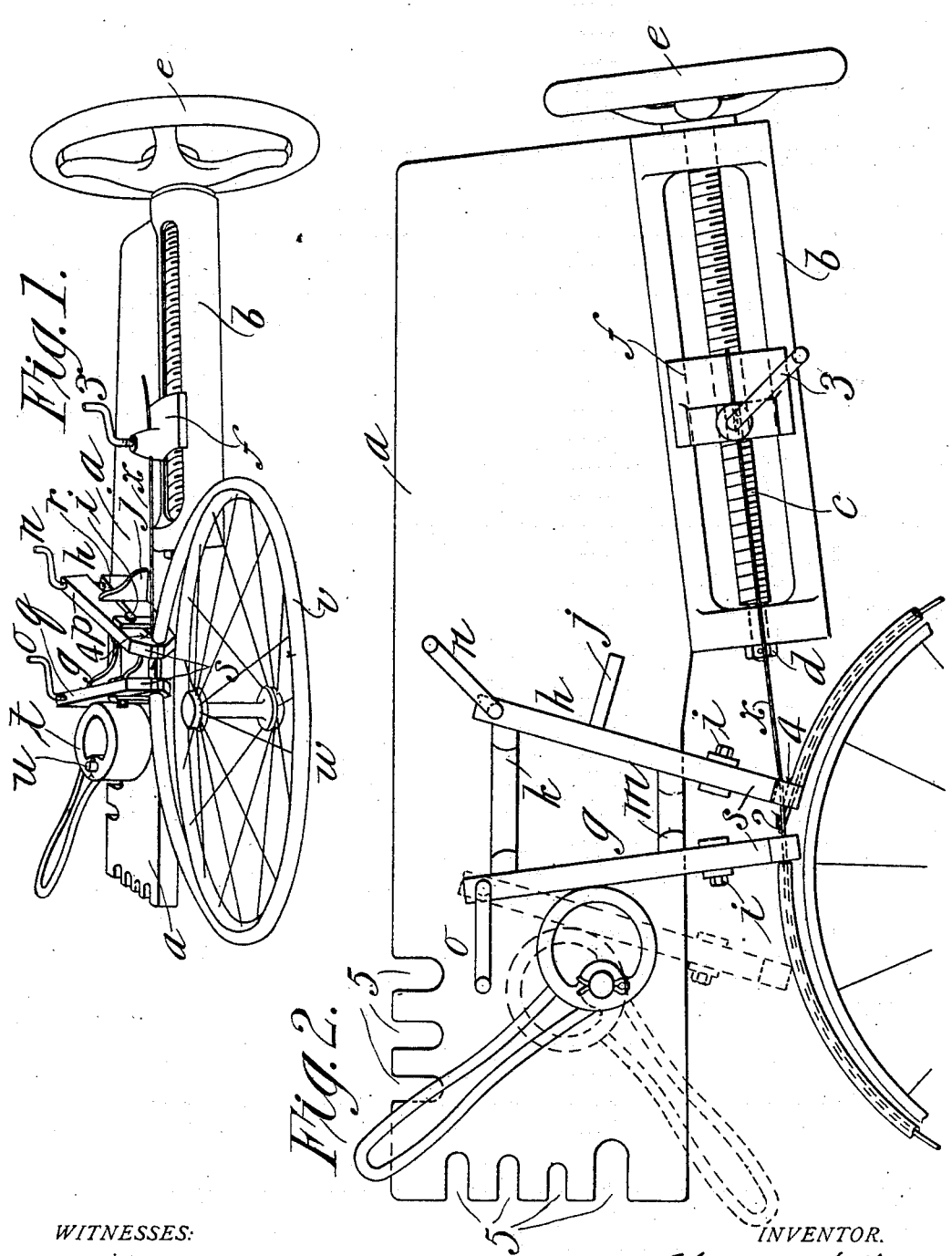
WITNESSES:
H. L. Sprague
H. W. Bourn.
INVENTOR.
Charles A. Maynard
BY
Chapin & Co.
ATTORNEY.

UNITED STATES PATENT OFFICE.

CHARLES A. MAYNARD, OF SPRINGFIELD, MASSACHUSETTS, ASSIGNOR TO MAYNARD RUBBER CORPORATION, OF SPRINGFIELD, MASSACHUSETTS, A CORPORATION OF CONNECTICUT.

RUBBER-TIRE SETTER.

No. 929,617.        Specification of Letters Patent.        Patented July 27, 1909.

Application filed July 20, 1908. Serial No. 444,333.

*To all whom it may concern:*

Be it known that I, CHARLES A. MAYNARD, a citizen of the United States of America, residing at Springfield, in the county of Hampden and State of Massachusetts, have invented new and useful Improvements in Rubber-Tire Setters, of which the following is a specification.

This invention relates to improvements in devices or machines for placing rubber tires on wheels, and it is particularly adapted for the placing of cushion tires on small wheels, as for baby carriages and carts.

The object of the invention is to provide means whereby a solid rubber or cushion tire can be readily made to accurately fit the rim of a wheel and then assembled in position on the rim.

In the drawings forming part of this application,—Figure 1 is a perspective view showing how the device is used. Fig. 2 is a plan view of the same, the position of the parts being at the instant when the wheel is being released.

Referring to the drawings in detail, $a$ designates the base-piece, preferably made flat and with the upper and lower surfaces thereof with parallel faces and of some suitable material having sufficient weight, as iron or preferably a composition of aluminium.

$b$ designates as a whole an offset portion integral with the part $a$ and which furnishes guide-ways for a traveler in which is rotatably mounted the screw $c$ which is provided with a retaining nut $d$ at one end and an operating hand-wheel $e$ at its opposite end. Upon the rotation of the hand-wheel $e$ the traveler $f$ can be moved in opposite directions by means of the screw $c$. The purpose of this traveler is for placing suitable tension upon the wire cord which passes through the hole in the tire during the brazing or soldering of the ends of the wire together.

$g$ and $h$ designate wire clamping jaws that are pivotally connected by means of pins or bolts $i$, the lower portion of the clamp $h$ being fixed to the base $a$, and to the right-angled brackets $j$, $k$, and $m$ which are secured to the base-piece. The clamps are provided with tightening screws $n$ and $o$ the lower ends of which (after threading through the movable portions $p$ and $q$ of the clamps $g$ and $h$) engage the upper surface $r$, thus causing the jaws $s$ to engage the fixed lower jaws of the clamps when operated, and thus securely clamping and holding the wire therein.

$t$ designates a holding cam whereby the clamp $g$ as a whole may be temporarily held against the angular brackets or stops $k$ and $m$, it being observed that this cam is pivotally secured to the base $a$ by means of the pin $u$ which is eccentrically located with relation to the cylindrical surface thereof.

Referring now to the operation of the machine or device: The tire, which is designated by the letter $v$, and the wheel by the letter $w$, is cut a little longer than the circumference of the rim in order to allow for compression and to insure a close joint when the ends of the tire are vulcanized. A section or length of wire $x$ is next cut somewhat longer than the length of the tire $v$; this wire is next inserted through the hole in the tire, the end of it being held from movement by means of the tightening screw $n$ in the clamp $h$ upon proper rotation of the same. It will be noticed that the end of the wire that is retained by the clamp $h$ is indicated at 2 about midway between the angularly arranged jaws $s$ of the two clamps (see Fig. 2). The tire is now placed on the rim and the free end of the wire, (which is designated at $x$) is secured to the traveler $f$ by means of the tightening screw 3 first passing freely through an opening 4 in the clamp $h$. The clamp $g$ which is pivoted to the base-plate $a$ is then moved against the brackets $k$ and $m$ by means of the cam $t$, the operator then rotates the hand-wheel $e$ thus drawing the tire $v$ tightly around the rim of the wheel $w$. When sufficient tension is placed thereon the tightening screw $o$ is operated rigidly clamping the wire $x$ where it passes through the jaws $s$ of the clamp $g$. The operator next severs the wire $x$ leaving an end that is crossed or adjacent the end 2 whereby the two ends of the same can then be readily brazed or soldered together. After the wire $x$ is severed, the cam $t$ is moved away from the clamp $g$ permitting the wheel $w$ to be removed from the tire. After the soldering of the ends of the wires 2 and $x$ is effected the wire is released from the clamping jaws $g$ and $h$ and the rubber carefully adjusted over the soldered ends of the wire. The rim of the wheel is now carefully supplied with rubber cement and the completed tire applied thereto by hand with the aid of mortises or cuts 5 in the base-piece $a$.

It will be seen that I have invented a device whereby rubber or cushion tires may be quickly and accurately secured together and an accurate fit obtained on the rim of a wheel.

What I claim, is:—

1. A tire applying device having in combination with a base-plate, wire clamping members $g$ and $h$, abutments $k$ and $m$, for the clamping members to bear against, a screw $c$, a traveler block $f$ operated thereby and adapted to clamp the end of a wire $x$, a holding cam $t$ for temporarily retaining the wire clamp $g$ in a fixed position, as described.

2. A tire applying device comprising a base-piece, wire-clamping members $g$ and $h$ made in two parts and mounted thereon, the member $g$ being pivoted to the base and the member $h$ being fixed to the base-piece, the upper portion or part of the clamping members being operable toward and from the lower portion thereof, a traveler $f$ provided with a screw element for holding a wire, a holding cam $t$ for temporarily retaining the wire-clamp $g$ in a fixed position, screws $n$ and $o$ for operating the upper portion of the clamping members $g$ and $h$ toward and from the lower portion thereof for clamping a wire therebetween, the base portion being provided with mortises or cutouts 5, as described.

CHARLES A. MAYNARD.

Witnesses:
K. S. CLEMONS,
H. W. BOWEN.